(12) United States Patent
Ishihara

(10) Patent No.: US 9,055,215 B2
(45) Date of Patent: Jun. 9, 2015

(54) SUBJECT DETECTION DEVICE AND SUBJECT DETECTION METHOD FOR DETECTING SUBJECT IMAGE FROM IMAGE USING SELECTED DISCRIMINATOR CORRESPONDING TO A PHOTOGRAPHING ENVIRONMENT

(71) Applicant: CASIO COMPUTER CO., LTD., Tokyo (JP)

(72) Inventor: Masanori Ishihara, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 5 days.

(21) Appl. No.: 13/946,791

(22) Filed: Jul. 19, 2013

(65) Prior Publication Data

US 2014/0022412 A1    Jan. 23, 2014

(30) Foreign Application Priority Data

Jul. 23, 2012    (JP) .................................. 2012-162545

(51) Int. Cl.
*H04N 5/232*    (2006.01)
*G06K 9/00*    (2006.01)

(52) U.S. Cl.
CPC ........ *H04N 5/23219* (2013.01); *G06K 9/00228* (2013.01)

(58) Field of Classification Search
None
See application file for complete search history.

(56) References Cited

U.S. PATENT DOCUMENTS

| 2001/0053292 A1* | 12/2001 | Nakamura | 396/661 |
| 2005/0100195 A1* | 5/2005 | Li | 382/118 |
| 2005/0200736 A1* | 9/2005 | Ito | 348/333.01 |
| 2008/0100724 A1 | 5/2008 | Hatano | |
| 2008/0180542 A1* | 7/2008 | Kuniyuki et al. | 348/222.1 |
| 2013/0022249 A1* | 1/2013 | Kameyama et al. | 382/128 |

FOREIGN PATENT DOCUMENTS

| JP | 2005210288 A | 8/2005 |
| JP | 2008054297 A | 3/2008 |
| JP | 2008-108024 A | 5/2008 |

OTHER PUBLICATIONS

Korean Office Action dated Sep. 30, 2014, issued in counterpart Korean Application No. 10-2013-0085010.

* cited by examiner

*Primary Examiner* — Justin P Misleh
(74) *Attorney, Agent, or Firm* — Holtz, Holtz, Goodman & Chick PC

(57) ABSTRACT

An image capture device (1) includes: a storage unit (19) that stores a plurality of discriminators corresponding to a plurality of photographing environment types, respectively; an acquisition unit (42) that sequentially acquires images; a selection unit (41) that selects a specific discriminator from among a plurality of discriminators that corresponds to the plurality of photographing environments, respectively; and a detection unit (43) that detects an image of a subject in images sequentially acquired by the acquisition unit.

7 Claims, 6 Drawing Sheets

SUBJECT DETECTION DEVICE AND SUBJECT DETECTION METHOD FOR DETECTING SUBJECT IMAGE FROM IMAGE USING SELECTED DISCRIMINATOR CORRESPONDING TO A PHOTOGRAPHING ENVIRONMENT

This application is based on and claims the benefit of priority from Japanese Patent Application No. 2012-162545, filed on 23 Jul. 2012, the content of which is incorporated herein by reference.

BACKGROUND OF THE INVENTION

1. Field of the Invention

The present invention relates to a subject detection device and a subject detection method for detecting a subject image from an image, and a storage medium therefor.

2. Related Art

Conventionally, a technology has been disclosed for improving detection accuracy even under conditions such as in backlighting when detecting a face region included in an image (hereinafter referred to as "face detection"), for example, in Japanese Unexamined Patent Application, Publication No. 2008-108024. Devices to which such a technology is applied estimate a face region after performing gain adjustment processing on data of a captured image which is photographed in backlighting.

SUMMARY OF THE INVENTION

An aspect of the present invention is a subject detection device including: an acquisition unit that sequentially acquires images;

a selection unit that selects a specific discriminator from among a plurality of discriminators that corresponds to a plurality of photographing environment types, respectively; and a detection unit that detects an image of a subject in images that are sequentially acquired by the acquisition unit, by employing the specific discriminator selected by the selection unit.

An aspect of the present invention is a subject detection method executed by a subject detection device, the method including the steps of:

acquiring images sequentially; selecting a specific discriminator from among a plurality of discriminators that corresponds to a plurality of photographing environment types, respectively; and detecting an image of a subject in images that are sequentially acquired in the step of acquiring, by employing the specific discriminator selected in the step of selecting.

An aspect of the present invention is a storage medium encoded with a computer-readable program that enables a computer to execute functions as: an acquisition unit that sequentially acquires images;

a selection unit that selects a specific discriminator from among a plurality of discriminators that corresponds to a plurality of photographing environment types, respectively; and a detection unit that detects an image of a subject in images that are sequentially acquired by the acquisition unit, by employing the specific discriminator selected by the selection unit.

DETAILED DESCRIPTION OF THE INVENTION

In the following, embodiments of the present invention are explained with reference to the drawings.

First Embodiment

Figure 1:
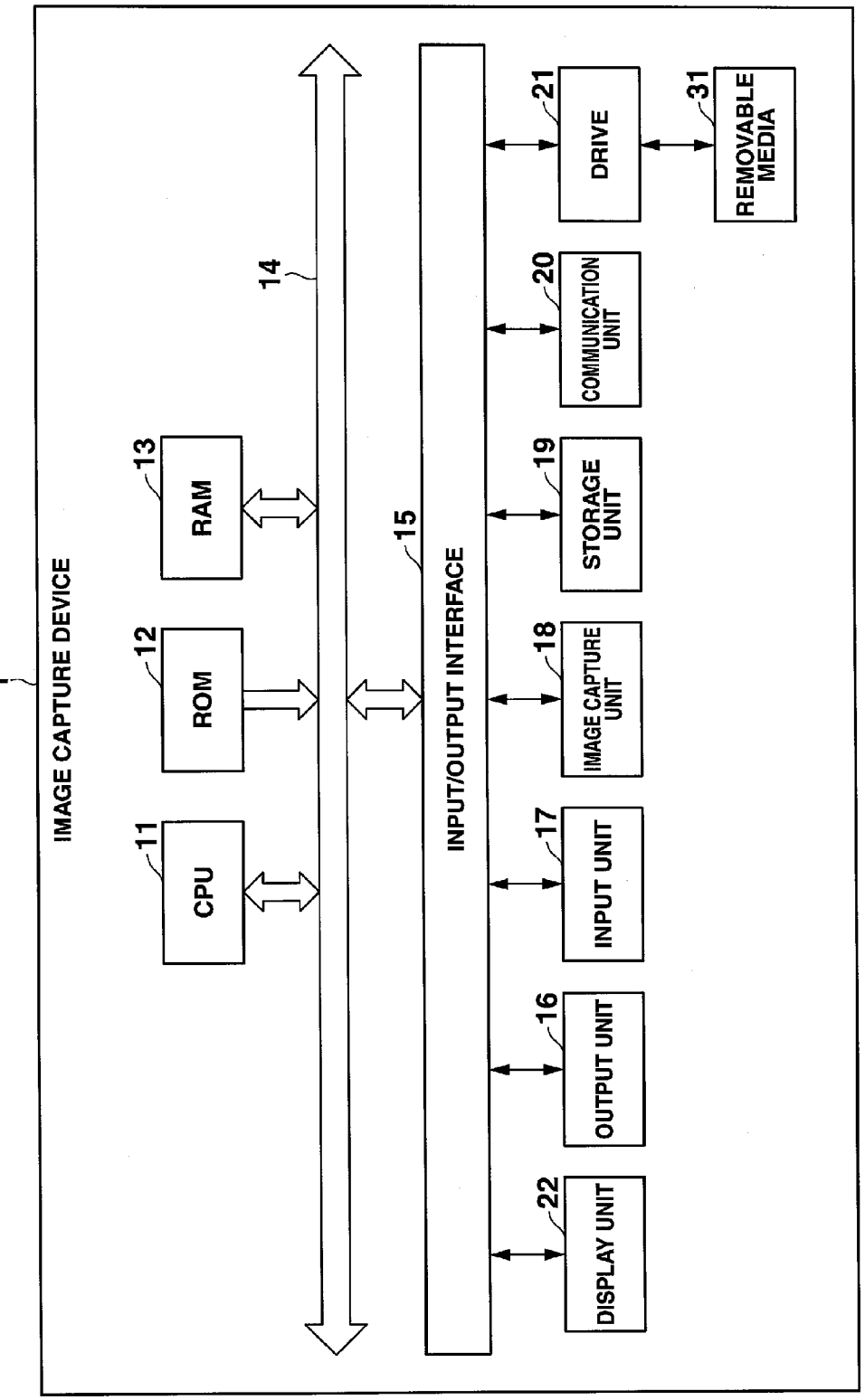
FIG. 1 is a block diagram showing a hardware configuration of an image capture device according to a first embodiment of the present invention.

FIG. 1 is a block diagram showing a hardware configuration of an image capture device according to a first embodiment of the present invention.

The image capture device 1 is configured as, for example, a digital camera.

The image capture device 1 includes a CPU (Central Processing Unit) 11, ROM (Read Only Memory) 12, RAM (Random Access Memory) 13, bus 14, an Input/Output interface 15, an output unit 16, an input unit 17, an image capture unit 18, a storage unit 19, a communication unit 20, a drive 21, and display unit 22.

The CPU 11 executes various processing according to programs that are recorded in the ROM 12, or programs that are loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The output unit 16, the input unit 17, the image capture unit 18, the storage unit 19, the communication unit 20, and the drive 21 are connected to the input/output interface 15.

The output unit 16 is configured by the display unit, a speaker, and the like, and outputs images and sound.

The input unit 17 is configured by various buttons such as a power button, a release button and the like, and inputs a variety of information in accordance with instruction operations by the user. It should be noted that various buttons referred to herein include not only hardware buttons, but also software buttons displayed on a screen of the output unit 16. In other words, the input unit 17 is configured so as to include a touch panel layered on a display of the output unit 16.

The image capture unit 18 photographs a subject and supplies to the CPU 11 data of an image including an image of the subject (hereinafter, referred to as "captured image").

The storage unit 19 is configured by hard disk or DRAM (Dynamic Random Access Memory) or the like, and stores data of various images.

The storage unit 19 also stores a face discriminator group (hereinafter, referred to as "discriminator group") corresponding to specific photographing environments for the respective photographing environments that are different from each other. With regard to the discriminator group, one publicly known or one to be devised in the future by way of any technology can be employed. In the present embodiment, the discriminator group for respective photographing environments such as in a backlighting situation, in a low illumination situation, and a normal situation (frontlighting situation) can be employed. The respective discriminator groups are configured by a plurality of face discriminators respectively corresponding to faces of the subjects facing in the respective different directions for every photographing environment. In the present embodiment, the abovementioned discriminator group is configured by four discriminators facing in the respective directions including: a direction of a subject facing a front face with respect to a lens side of a camera such as the image capture device 1 (hereinafter, referred to as "front face direction"); a direction of rotated around an optical axis of the image capture device 1 (hereinafter, referred to as "roll direction"); a direction of rotated around a vertical direction (hereinafter, referred to as "yaw direction"); and a direction rotated around a horizontal direction (hereinafter, referred to as "pitch direction").

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

The display unit 22 not only displays a live view image captured by the image capture device 18, but also a recorded image that is played back. Furthermore, in the display unit 22, a frame is displayed for a face detected in the face detection control processing of the present embodiment.

Figure 2:
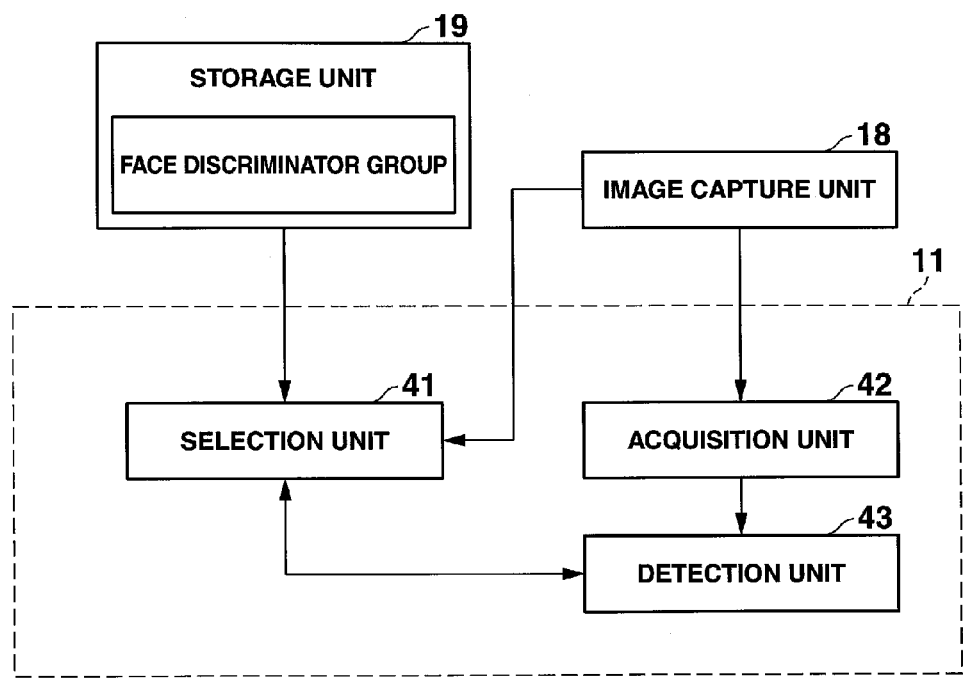
FIG. 2 is a functional block diagram showing a functional configuration for executing face detection control processing from among functional configurations of the image capture device of FIG. 1.

FIG. 2 is a functional block diagram showing a functional configuration for executing face detection control processing from among functional configurations of such an image capture device 1.

The face detection control processing starts when an operation mode of the image capture device 1 is changed to a face detection mode by pressing a shutter button of the input unit 17 halfway by a user. More specifically, the face detection control processing refers to the following processing. The face detection control processing refers to a sequence of processing of: performing face detection processing while switching a plurality of discriminator groups set in advance; and, after the face detection has succeeded, in the subsequent face detection processing, performing the face detection processing using a discriminator group for which the face detection succeeded. For example, the face detection processing refers to processing of estimating a face region in accordance with an algorithm called Neural Network (NN), AdaBoost, or Support Vector Machine (SVM), based on the respective discriminator groups.

Since the face detection processing in accordance with Neural Network (NN), AdaBoost, or Support Vector Machine (SVM) is s publicly known technique, the detailed description therefor will be omitted in the embodiments of the present application.

It should also be noted that pressing halfway refers to an operation of pressing down the shutter button of the input unit 17 halfway (down to a predetermined position but not reaching the lower limit).

A selection unit 41, an acquisition unit 42, and a detection unit 43 function in the CPU 11 when the face detection control processing is performed.

It should also be noted that the configuration of FIG. 2 is an example and the image capture device 1 may also be provided with dedicated hardware for image processing such as GA (Graphics Accelerator) which may take over at least a part of the functions of CPU 11.

Furthermore, as described above, the storage unit 19 stores a plurality of the discriminator groups of subjects corresponding to specific photographing environments.

The selection unit 41 selects a specific discriminator group from among the plurality of discriminator groups stored in the storage unit 19. Here, a specific discriminator group refers to a discriminator group specialized for detecting a subject under a specific photographing environment such as in a normal situation, in a backlighting situation, and a low illumination situation.

More specifically, the selection unit 41 specifies a subject in a captured image based on data of the captured image acquired by the acquisition unit 42 (described later) and selects a specific discriminator group that matches the subject. The selection unit 41 calculates a degree of similarity between face regions of the respective discriminators belonging to a specific discriminator group and a face region of a subject in a captured image. The selection unit 41 identifies discriminators having a degree of similarity no less than a predetermined value as a discriminator that matches a face of a subject. For an order of selecting specific discriminator groups, the selection unit 41 employs the sequence of selecting a discriminator group in a normal situation, a discriminator group in a backlighting situation, and a discriminator group in a low illumination situation stored in the storage unit 19, in this order, for example. Then, the selection unit 41 selects a specific discriminator group while switching discriminator groups in this order. Furthermore, when the selection unit 41 is notified from the detection unit 43 (described later) that the face detection fails, it switches from the discriminator group previously selected to a different discriminator group. The selection unit 41 generates information that can specify the discriminator group thus selected and supplied it to the detection unit 43.

Here, regarding the order for switching discriminator groups when the face detection fails, the face detection may be performed while switching discriminator groups in order from the initial order (discriminator group in a normal situation) or the face detection may be performed while switching discriminator groups in order from a discriminator group following the discriminator group in which the face detection failed.

The acquisition unit 42 sequentially acquires data of a captured image captured by the image capture unit 18. The acquisition unit 42 sequentially supplies data of a captured image to the detection unit 43 each time it acquires data of a captured image.

The detection unit 43 performs the face detection processing using data of captured images that are sequentially acquired by the acquisition unit 42. Each time data of a captured image is acquired by the acquisition unit 42, the detection unit 43 detects a face region of a subject in a captured image using a specific discriminator group selected by the selection unit 41. More specifically, the detection unit 43 switches each of discriminators belonging to the specific discriminator group selected by the selection unit 41, and more specifically, the detection unit switches a discriminator in the front face direction, a discriminator in the roll direction, a discriminator in the yaw direction, and a discriminator in the pitch direction in this order. The detection unit 43 performs the face detection processing each time it switches each discriminator group.

In this way, since the detection unit 43 performs the face detection processing by using a discriminator group according to a specific photographing environment such as in a normal situation, in a backlighting situation, and in a low illumination situation, the accuracy of the face detection improves.

It should also be noted that, in a case in which the face detection fails (face detection is lost), the detection unit 43 performs the face detection processing again using a discriminator group switched by the selection unit 41. The detection unit 43 notifies the selection unit 41 of information of whether the face detection could be performed by the detection unit.

Figure 3:
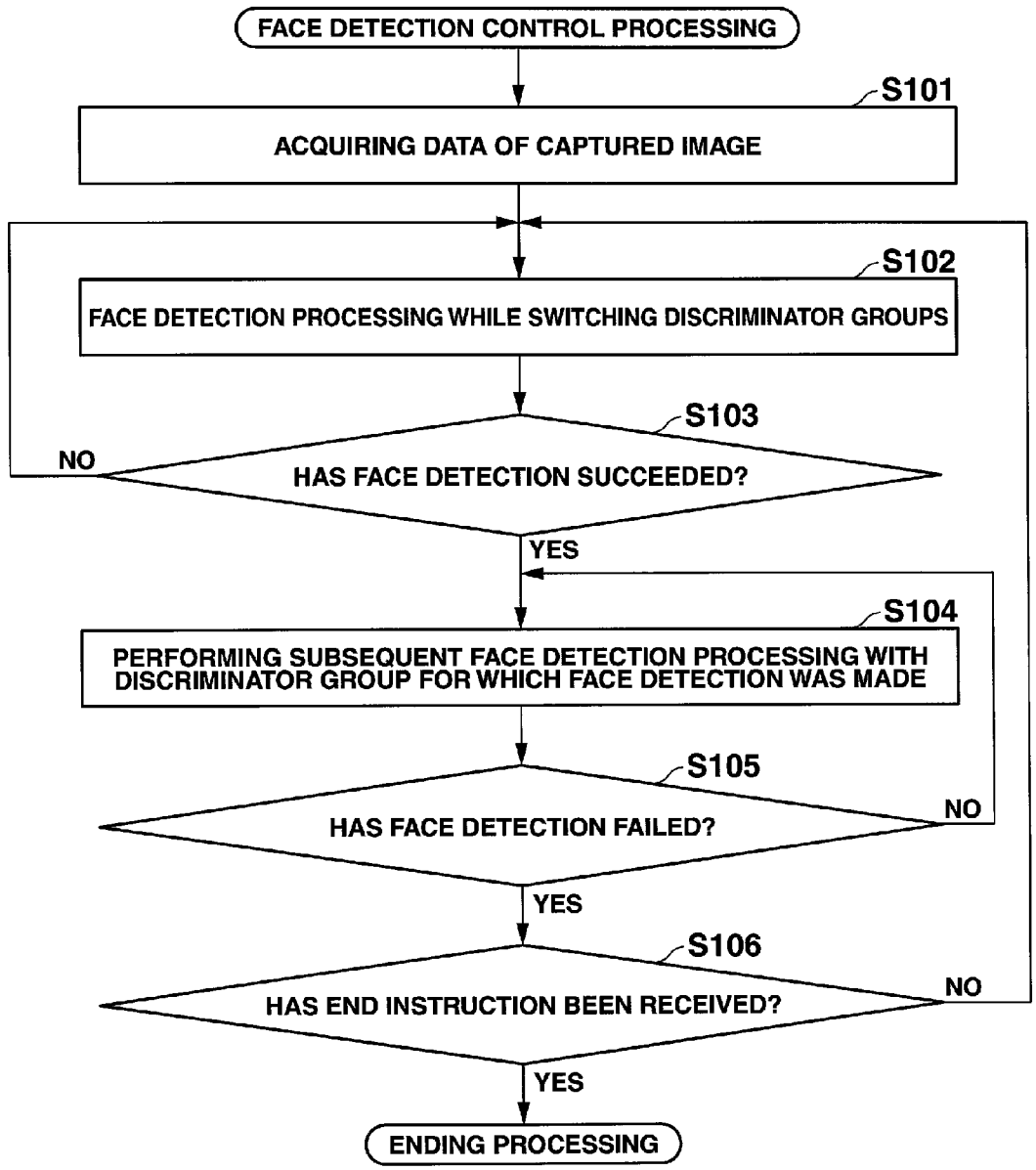
FIG. 3 is a flowchart showing a flow of the face detection control processing executed by the image capture device of FIG. 1 having the functional configuration of FIG. 2.

Next, with reference to FIG. 3, face detection control processing is described that is executed by the image capture device 1 having the functional configuration of FIG. 2.

FIG. 3 is a flowchart showing a flow of face detection control processing executed by the image capture device 1 of FIG. 1 having the functional configuration of FIG. 2.

For example, the face detection control processing starts when an operation mode of the image capture device 1 is changed to the face detection mode by a shutter button of the input unit 17 having been pressed halfway by a user, and the following processing is performed.

In Step S101, the acquisition unit 42 sequentially acquires data of a captured image captured by the image capture unit 18.

In Step S102, the detection unit 43 performs the face detection processing while switching discriminator groups. In this processing, the selection unit 41 initially specifies a subject in a captured image based on data of the captured image acquired by the acquisition unit 42 and selects a specific discriminator group that matches the subject. Then, the detection unit 43 performs the face detection processing that detects a face region of a subject in a captured image using the discriminator group selected by the selection unit 41.

In Step S103, the detection unit 43 determines whether the face detection succeeded. In a case in which the face detection did not succeed, a NO determination is made in Step S103, and the processing returns back to Step S102. In other words, the selection of the discriminator groups by the selection unit 41 is repetitively performed until the face detection succeeds. On the other hand, in a case in which the face detection succeeded, a YES determination is made in Step S103, and the processing advances to Step S104.

In Step S104, the detection unit 43 performs subsequent face detection processing with a discriminator group for which the face detection was performed. In this processing, the detection unit 43 performs the face detection processing by employing the discriminator group selected in Step S102 immediately before the determination that the face detection succeeded in Step S103. The accuracy of the face detection processing can be improved in this way.

In Step S105, the detection unit 43 determines whether the face detection could be performed or not. In a case in which the face detection succeeded, a NO determination is made in Step S105 and the processing returns back to Step S104. In other words, while the face detection can be performed, the face detection processing is performed continuously employing the discriminator group selected in Step S102 immediately before the determination that the face detection succeeded in Step S103. On the other hand, in a case in which the face detection could not be performed, a YES determination is made in Step S105 and the processing advances to Step S106.

In Step S106, the face detection unit 43 determines whether an end instruction of the face detection control processing was received. In a case of not having received the end instruction, a NO determination is made in Step S106 and the processing returns back to Step S102. In other words, in case of not having received the end instruction of the face detection control processing, the detection unit 43 performs the face detection processing while switching each discriminator group again, and the processing from Steps S102 to S106 is performed repetitively. On the other hand, in a case of having received the end instruction of the face detection control processing, a YES determination is made in Step S106, and the face detection control processing ends.

As described above, the image capture device 1 according to the present embodiment includes the selection unit 41, the acquisition unit 42, and the detection unit 43. The selection unit 41 selects a specific discriminator group from among discriminator groups of a subject corresponding to specific photographing environments that are stored in a predetermined storage unit 19. The acquisition unit 42 sequentially acquires images captured by the image capture unit 18. The detection unit 43 detects an image of a subject in captured images that are sequentially acquired by employing a specific discriminator group selected by the selection unit 41.

In this way, since it is possible to perform detection of an image of a subject based on a discriminator group corresponding to a specific photographing environment, it is possible to perform detection of a subject more appropriately even under a changing photographing environment. Furthermore, even in a case in which a photographing environment changes to a different one after having applied a discriminator group corresponding to a predetermined photographing environment to processing of detecting a subject, it is possible to perform detection of a subject, according to a subsequent photographing environment. In this way, even in a case in which a photographing environment changes, it is possible to perform detection of a subject with high accuracy without additionally providing a sensor for detecting a photographing environment.

Furthermore, the selection unit 41 according to the present embodiment selects a specific discriminator that matches a subject in a captured image acquired by the acquisition unit 42 by employing each of discriminator groups of a plurality of discriminators stored in the storage unit 19 in order.

In this way, since it is possible to perform detection of a subject based on a discriminator group selected so as to correspond to various photographing environments, it is possible to improve the accuracy of detecting a subject.

The image capture device 1 according to the first embodiment of the present invention has been described above.

Next, an image capture device 1 according to the second embodiment of the present invention is described below.

Second Embodiment

The image capture device 1 according to the second embodiment can basically assume a hardware configuration similar to the image capture device 1 according to the first embodiment.

Therefore, FIG. 1 can also be recognized as a block diagram showing a hardware configuration of the image capture device 1 according to the second embodiment.

However, although the selection unit 41 of the first embodiment selects a specific discriminator group by employing a plurality of discriminator groups in order, the selection unit 41 of the second embodiment selects as a specific discriminator group a discriminator group for which a summation of the number of times an image of a subject matches with each discriminator belonging to a discriminator group selected is the greatest. Therefore, the image capture device 1 according to the second embodiment further includes a calculation unit 51. In the following, such a difference is mainly explained and explanations for similar configurations are omitted as appropriate.

Furthermore, a flow of face detection control processing executed by the image capture device 1 according to the second embodiment is basically similar to the face detection control processing according to the first embodiment. However, although the face detection control processing according to the first embodiment performs subsequent face detection processing with a discriminator group for which the face detection processing was performed after switching each discriminator group, the face detection control processing according to the second embodiment is performed by employing a discriminator group for which a summation of the number of detections is the greatest in the face detection processing.

Figure 4:
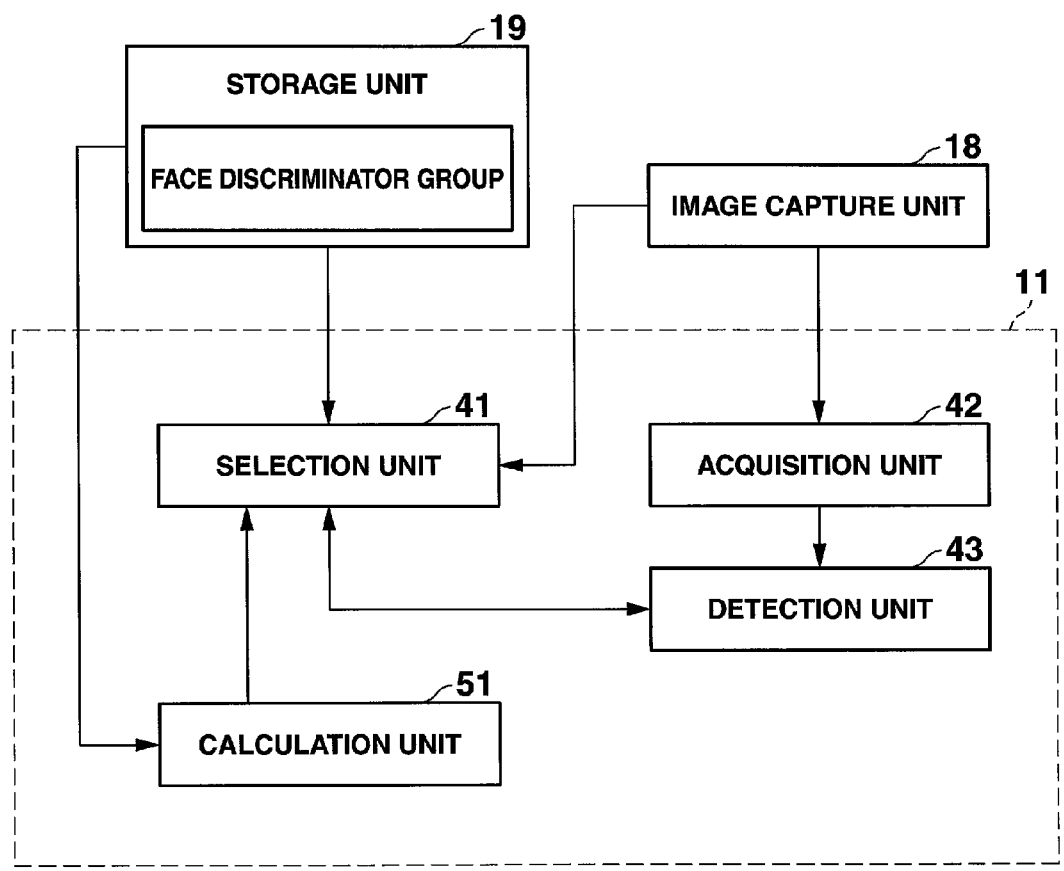
FIG. 4 is a functional block diagram showing a functional configuration for executing face detection control processing according to a second embodiment from among the functional configurations of the image capture device of FIG. 1.

FIG. 4 is a functional block diagram showing a functional configuration for executing face detection control processing according to the second embodiment from among the functional configurations of the image capture device 1.

In a case in which the face detection control processing of the second embodiment is performed, the selection unit 41, the acquisition unit 42, the detection unit 43, and calculation unit 51 function in the CPU 11.

The calculation unit 51 calculates the number of times for which an image of a subject matches with each discriminator belonging to a discriminator group used in the face detection processing while cyclically employing each discriminator of the plurality of discriminator groups stored in the storage unit 19 during a predetermined period of time. More specifically, the calculation unit 51 switches each discriminator among selected discriminator groups (a discriminator in the front face direction, a discriminator in the roll direction, a discriminator in the yaw direction, and a discriminator in the pitch direction) in order within a predetermined period of time so as to calculate the number of times corresponding to the result for which the face detection processing was performed. For example, in a case in which a discriminator in the front face direction and a discriminator in the yaw direction included in the discriminator groups in the backlighting situation match a subject in a captured image each one time, the number of times of a face image matching with the discriminator groups in the backlighting situation is set to be 1+1=2. The calculation unit 51 supplies information of the number of times calculated for each discriminator group to the selection unit 41.

The selection unit 41 selects a discriminator group for which the number of times calculated by the calculation unit 51 is the greatest as a specific discriminator group. It should also be noted that, in a case in which the summations of the face detections of each discriminator group become equal, a discriminator group is selected which is detected first from among the discriminator groups for which the summations become equal. The selection unit 41 supplies information of the discriminator group selected to the detection unit 43.

Figure 5:
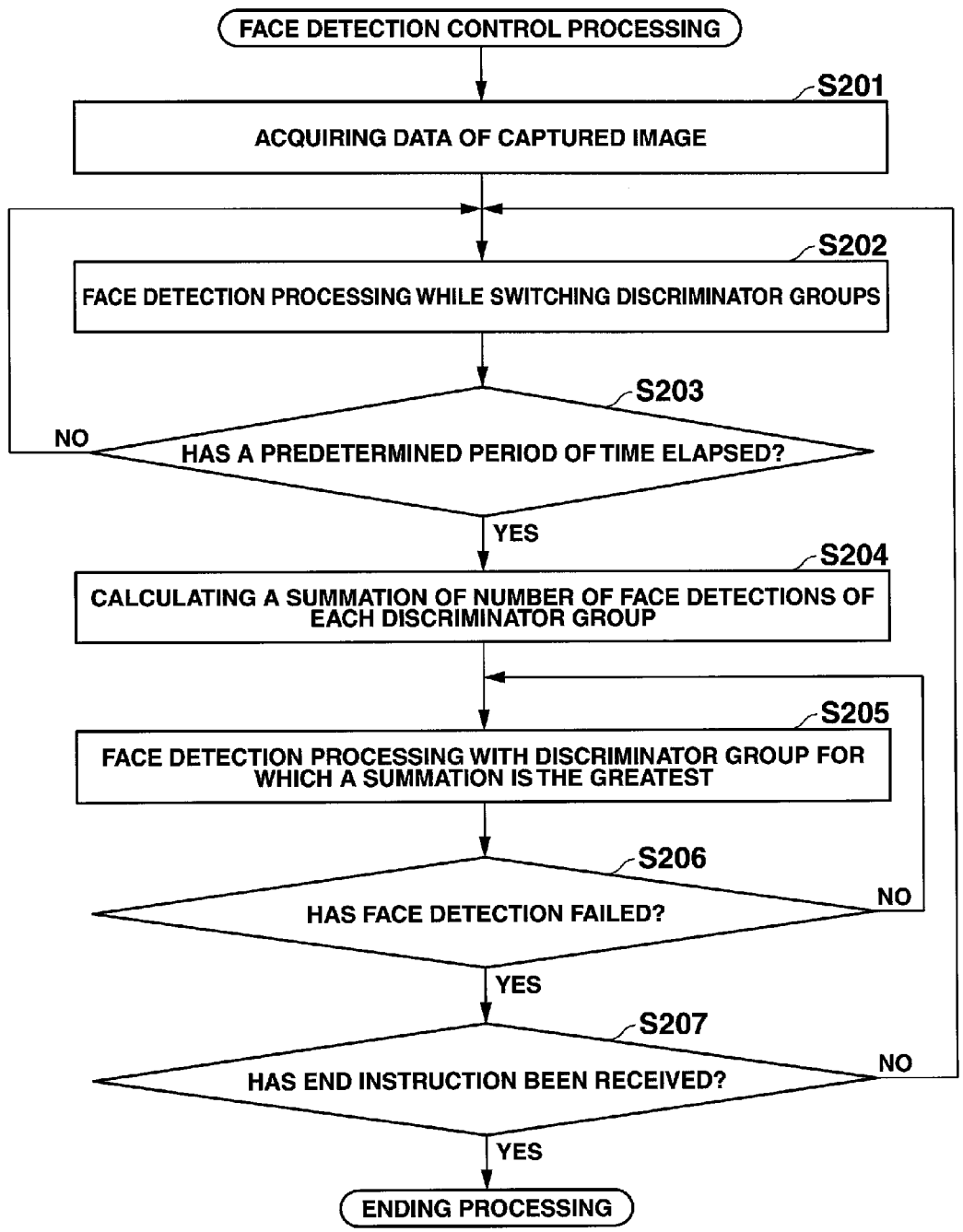
FIG. 5 is a flowchart showing a flow of the face detection control processing according to the second embodiment executed by the image capture device of FIG. 1 having the functional configuration of FIG. 4.

Next, with reference to FIG. 5, face detection control processing executed by the image capture device 1 according to the second embodiment having the functional configuration of FIG. 4 is described.

FIG. 5 is a flowchart showing a flow of the face detection control processing executed by the image capture device 1 according to the second embodiment of FIG. 1 having the functional configuration of FIG. 4.

The face detection control processing starts when an operation mode of the image capture device 1 is changed to a face detection mode by a shutter button of the input unit 17 having been pressed halfway by a user and the following processing is performed repetitively.

In Step S201, the acquisition unit 42 sequentially acquires data of captured images captured by the image capture unit 18.

In Step S202, the detection unit 43 performs the face detection processing while switching discriminator groups. In this processing, the selection unit 41 initially specifies a subject in a captured image based on data of the captured image acquired by the acquisition unit 42, and selects a specific discriminator group that matches the subject. Then, the detection unit 43 performs the face detection processing that detects a face region of a subject in a captured image using the discriminator group selected by the selection unit 41.

In Step S203, the calculation unit 51 determines whether a predetermined period of time has elapsed. In this processing, the calculation unit 51 waits until face detection processing by each discriminator group is performed during a predetermined period of time while counting an arbitrary period of time n until each discriminator group is switched several times by the selection unit 41. The number of times each discriminator group is switched can be set arbitrarily in a range of 1 to 100, for example. In a case in which a predetermined period of time has not elapsed, a NO determination is made in Step S203, and the processing returns back to Step S202. In other words, until a predetermined period of time elapses, the selection of a discriminator group by the selection unit 41 is performed repetitively. On the other hand, in a case in which a predetermined period of time has elapsed, a YES determination is made in Step S203, and the processing advances to Step S204.

In Step S204, the calculation unit 51 calculates a summation of the number of face detections of each discriminator group detected in the face detection processing of Step S202.

In Step S205, the detection unit 43 performs the face detection processing with a discriminator group for which a summation of the number of face detections calculated in Step S204 is the greatest. In this processing, the detection unit 43 performs the face detection processing with a discriminator group for which the summation of the number of face detections is the greatest, i.e. succeeded in the greatest number of face detections. The accuracy of the face detection processing can improve in this way.

In Step S206, the detection unit 43 determines whether the face detection could be performed or not. In a case in which the face detection succeeded, a NO determination is made in Step S206 and the processing returns back to Step S205. In other words, while the face detection succeeds, the face detection processing is performed continuously by employing a discriminator group for which the summation of the number of face detections is the greatest. On the other hand, in a case in which the face detection could not be performed, a YES determination is made in Step S206 and the processing advances to Step S207.

In Step S207, the face detection unit 43 determines whether an end instruction of the face detection control processing has been received. In a case of not having received the end instruction, a NO determination is made in Step S207, and the processing returns back to Step S202. In other words, in a case of not having received the end instruction of the face detection control processing, the detection unit 43 performs the face detection processing while switching each discriminator group again, and the processing from Steps S202 to S206 is performed repetitively. On the other hand, in a case of having received the end instruction of the face detection control processing, a YES determination is made in Step S207 and the face detection control processing ends.

As described above, the image capture device 1 according to the second embodiment further includes the calculation unit 51. The calculation unit 51 calculates the number of times an image of a subject matches with each discriminator while cyclically employing each discriminator of the plurality of discriminator groups stored in the storage unit 19 during a predetermined period of time. Then, the selection unit 41 selects a discriminator group for which the summation of the number of times calculated by the calculation unit 51 is the greatest as a specific discriminator group.

In this way, since it is possible to detect an image of a subject based on a discriminator group for which the summation of the number of times matching an image of a subject is the greatest, it is possible to detect an image of a subject with high accuracy.

The image capture device 1 according to the second embodiment of the present invention has been described above.

Next, an image capture device 1 according to the third embodiment of the present invention is described below.

Third Embodiment

The image capture device 1 according to the third embodiment can basically assume a hardware configuration similar to the image capture device 1 according to the first embodiment.

Therefore, FIG. 1 can also be recognized as a block diagram showing a hardware configuration of the image capture device 1 according to the third embodiment.

Furthermore, a flow of face detection control processing executed by the image capture device 1 according to the third embodiment is basically similar to the face detection control processing according to the first embodiment. However, the face detection control processing according to the third embodiment further stores a face detection result from each discriminator group to a buffer in FIFO (First In, First Out) format and processes to integrate an image of a subject. The buffer in FIFO format refers to the format of a buffer in which a face detection result which is stored subsequently in a buffer is replaced by a face detection result which is stored first in a buffer to be stored in a case in which a face detection result of an amount exceeding a predetermined buffer area with respect to a buffer area having a predetermined storage area provided in the storage unit 19 is stored. Furthermore, processing to integrate an image of a subject refers to processing to integrate detection results of a plurality of images of subjects.

Figure 6:
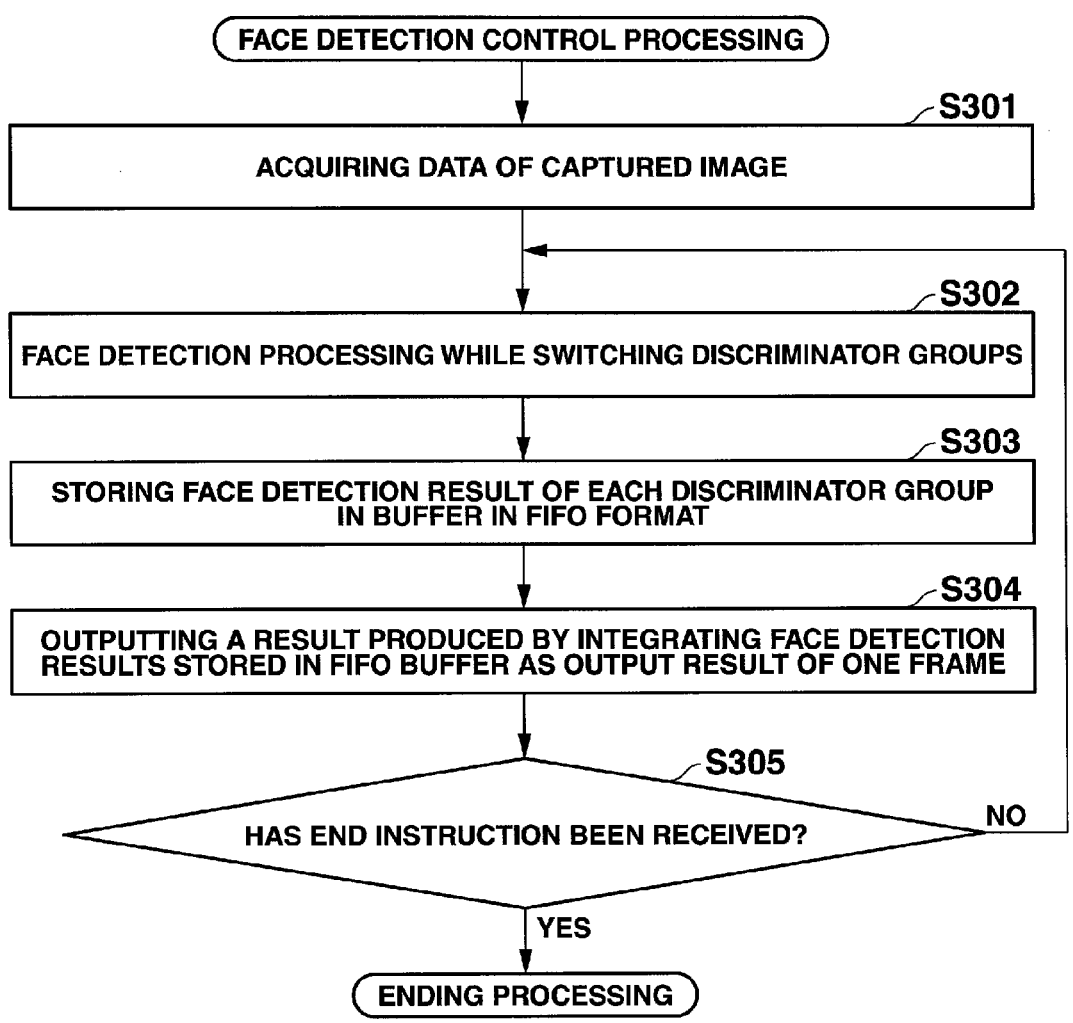
FIG. 6 is a flowchart showing a flow of face detection control processing according to a third embodiment executed by the image capture device of FIG. 1 having the functional configuration of FIG. 2.

With reference to FIG. 6, face detection control processing executed by the image capture device 1 according to the third embodiment having the functional configuration of FIG. 2 is described.

FIG. 6 is a flowchart showing a flow of the face detection control processing executed by the image capture device 1 according to the third embodiment of FIG. 1 having the functional configuration of FIG. 2.

The face detection control processing starts when an operation mode of the image capture device 1 is changed into a face detection mode by a shutter button of the input unit 17 having been pressed halfway by a user, and the following processing is performed repetitively.

In Step S301, the acquisition unit 42 sequentially acquires data of captured images captured by the image capture unit 18.

In Step S302, the detection unit 43 performs the face detection processing while switching discriminator groups. In this processing, the selection unit 41 initially specifies a subject in a captured image based on data of the captured image acquired by the acquisition unit 42, and selects a specific discriminator group that matches the subject. Then, the detection unit 43 performs the face detection processing that detects a face region of a subject in a captured image using the discriminator group selected by the selection unit 41.

In Step S303, the detection unit 43 stores face detection results from each discriminator group detected in Step S302 in a FIFO buffer in the FIFO format. In this processing, the detection unit 43 stores face detection results detected in the face detection processing in a FIFO buffer formed in an area of the storage unit 19. In a case in which a face detection result of an amount exceeding a predetermined buffer area is stored, a face detection result which is stored subsequently in a buffer is replaced by a face detection result which is stored first in a buffer to be stored by the detection unit 43.

In Step S304, the detection unit 43 outputs a result produced by integrating the face detection results stored in the FIFO buffer stored in Step S303 as an output result of one frame. For a integrating method, the detection unit 43 performs processing of averaging results in which a face position and a face size in images of subjects stored in the FIFO buffer are similar to each other so as to merge those into one frame. It should be noted that, in a case in which there is no result in which a face position and a face size in images of subjects stored in the FIFO buffer are similar to each other, a face position and a face size stored in the FIFO buffer are outputted unaltered as an output result of one frame. The accuracy of the face detection processing can be improved in this way.

Furthermore, as processing after output, it may be configured to display a detection frame of a face on the display unit 22 based on a face position and a face size with respect to an output result.

In Step S305, CPU 11 determines whether an end instruction of the face detection control processing has been received. In a case of not having received the end instruction, a NO determination is made in Step S305, and the processing returns back to Step S302. In other words, until having received the end instruction of the face detection control processing, a result produced by integrating the face detection results stored in the FIFO buffer is continuously outputted as an output result of one frame. On the other hand, in a case of having received the end instruction of the face detection control processing, a YES determination is made in Step S305, and the face detection control processing ends.

As described above, the image capture device 1 according to the third embodiment integrates images of subjects by storing detection results of the detection unit 43 with respect to each captured image sequentially acquired by the acquisition unit 42. In this way, since it is possible to detect an image of a subject according to most recent photographing environments, it is possible to detection an image of a subject with high accuracy.

It should be noted that the present invention is not to be limited to the aforementioned embodiment, and that modifications, improvements, etc. within a scope that can achieve the object of the present invention are also included in the present invention.

For example, although discriminator groups are selected automatically in the face detection control processing in the abovementioned embodiment, the present invention is not limited thereto.

In other words, in order for a user herself/himself to select individually "a face detection mode in a normal situation (a face detection mode using discriminator groups in a normal situation)", "a face detection mode in a backlighting situation (a face detection mode using discriminator groups in a backlighting situation)", or "a face detection mode in a low-illumination situation (a face detection mode using discriminator groups in a low-illumination situation)" from among a plurality of face detection modes, it may be configured that a discriminator group used for face detection control is set by the user herself/himself determining a photographing environment.

Furthermore, in the abovementioned embodiment, as the order of selecting specific discriminator groups, the selection unit 41 employs the sequence of selecting discriminator groups in a normal situation, discriminator groups in a backlighting situation, and discriminator groups in a low illumination situation stored in the storage unit 19, by switching in this order. However, the present invention is not limited thereto. For example, it may be configured by additionally providing to the image capture device 1 an illumination sensor as a determination means of a photographing environment, the order of switching discriminator groups by the selection unit 41 may be changed according to a photographing environment detected by the illumination sensor. For example, in a case of detecting a backlight by the illumination sensor in a photographing environment, the selection unit 41 selects a discriminator group in a backlighting situation preferentially. Furthermore, in a case of detecting low illumination as the photographing environment according to the illumination sensor, the selection unit 41 selects a discriminator group in a low illumination situation preferentially. Furthermore, it may be configured to determine a photographing environment by analyzing brightness in an image as a determination means of a photographing environment.

Furthermore, in the abovementioned embodiments, the selection unit 43 performs face detection processing while switching a discriminator in the front face direction, a discriminator in the roll direction, a discriminator in the yaw direction, and the pitch direction that are included in each discriminator group selected, in this order. However, the present invention is not limited thereto. For example, the selection unit 43 can perform the face detection processing simultaneously for the discriminators of the respective directions included in a discriminator group selected.

Furthermore, in the abovementioned embodiments, although each of the embodiments is independently performed, the present invention is not limited thereto. For example, the respective processing of the image capture device 1 according to the first embodiment, the image capture device 1 according to the second embodiment, and the image capture device 1 according to the third embodiment can be performed by combining.

Furthermore, although the abovementioned embodiments are examples for the face detection control processing, the present invention is not limited thereto. For example, if employing each discriminator group for detecting a hand as a target, and not just for the face detection control, the abovementioned embodiments can be applied for detecting a hand. Furthermore, the abovementioned embodiments can be applied for detecting a face of an animal, not just for a face of human as a target. In other words, the present embodiments can be applied for detecting any subject by setting any subject as a design target of a discriminator group.

In the aforementioned embodiments, a digital camera has been described as an example of the image capture device 1 to which the present invention is applied; however, the present invention is not particularly limited thereto.

For example, the present invention can be applied to any electronic device in general having an image capture function. More specifically, for example, the present invention can be applied to a lap-top personal computer, a television, a video camera, a portable navigation device, a cell phone device, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image capture device 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 19 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

What is claimed is:

1. A subject detection device comprising:
    an acquisition unit that sequentially acquires images;
    a selection unit that selects a specific discriminator from among a plurality of discriminators that correspond to a plurality of photographing environment types, respectively;
    a detection unit that detects a subject image in the sequentially acquired images, by using the selected specific discriminator; and a determination unit that, by using each of the plurality of discriminators in order, determines a discriminator that matches the subject image in the acquired images from among the plurality of the discriminators, wherein the selection unit selects the specific discriminator based on a determination result by the determination unit.

2. The subject detection device according to claim 1, further comprising:

a calculation unit that calculates a number of times each discriminator matches with the subject image, by cyclically using the plurality of discriminators within a predetermined period of time, wherein the determination unit determines the discriminator based further on the calculated number of times.

3. A subject detection device comprising:

an acquisition unit that sequentially acquires images;

a selection unit that selects a specific discriminator from among a plurality of discriminators that correspond to a plurality of photographing environment types, respectively;

a detection unit that detects a subject image in the sequentially acquired images, by using the selected specific discriminator;

an integration unit that integrates detection results from the detection unit with respect to the sequentially acquired images; and a position determination unit that determines a position of a subject image in an image based on an integration result by the integration unit.

4. A subject detection device comprising:

an acquisition unit that sequentially acquires images;

a selection unit that selects a specific discriminator from among a plurality of discriminators that correspond to a plurality of photographing environment types, respectively; and a detection unit that detects a subject image in the sequentially acquired images, by using the selected specific discriminator;

wherein the selection unit selects a specific discriminator group from among a plurality of discriminator groups that correspond to the plurality of photographing environments, respectively; and wherein the detection unit detects the subject image in the sequentially acquired images, by using the selected specific discriminator group.

5. A subject detection method executed by a subject detection device, the method comprising:

acquiring images sequentially;

selecting a specific discriminator from among a plurality of discriminators that correspond to a plurality of photographing environment types, respectively; and detecting a subject image in the sequentially acquired images, by using the selected specific discriminator, wherein the method further comprises, by using each of the plurality of discriminators in order, determining a discriminator that matches the subject image in the acquired images from among the plurality of the discriminators, wherein the selecting comprises selecting the specific discriminator based on a result of the determining.

6. A subject detection method executed by a subject detection device, the method comprising:

acquiring images sequentially;

selecting a specific discriminator from among a plurality of discriminators that correspond to a plurality of photographing environment types, respectively;

detecting a subject image in the sequentially acquire images, by using the selected specific discriminator;

integrating results of the detecting with respect to the sequentially acquired images; and determining a position of a subject image in an image based on a result of the integrating.

7. A subject detection method executed by a subject detection device, the method comprising:

acquiring images sequentially;

selecting a specific discriminator from among a plurality of discriminators that correspond to a plurality of photographing environment types, respectively; and detecting a subject image in the sequentially acquired images, by using the selected specific discriminator;

wherein the selecting comprises selecting a specific discriminator group from among a plurality of discriminator groups that correspond to the plurality of photographing environments, respectively; and wherein the detecting comprises detecting the subject image in the sequentially acquired images, by using the selected specific discriminator group.

* * * * *

UNITED STATES PATENT AND TRADEMARK OFFICE
CERTIFICATE OF CORRECTION

| | | |
|---|---|---|
| PATENT NO. | : 9,055,215 B2 | Page 1 of 1 |
| APPLICATION NO. | : 13/946791 | |
| DATED | : June 9, 2015 | |
| INVENTOR(S) | : Masanori Ishihara | |

It is certified that error appears in the above-identified patent and that said Letters Patent is hereby corrected as shown below:

In The Claims

Column 14, claim 6, line 7 delete "acquire" and insert --acquired--.

Signed and Sealed this
Twelfth Day of January, 2016

Michelle K. Lee
*Director of the United States Patent and Trademark Office*